UNITED STATES PATENT OFFICE.

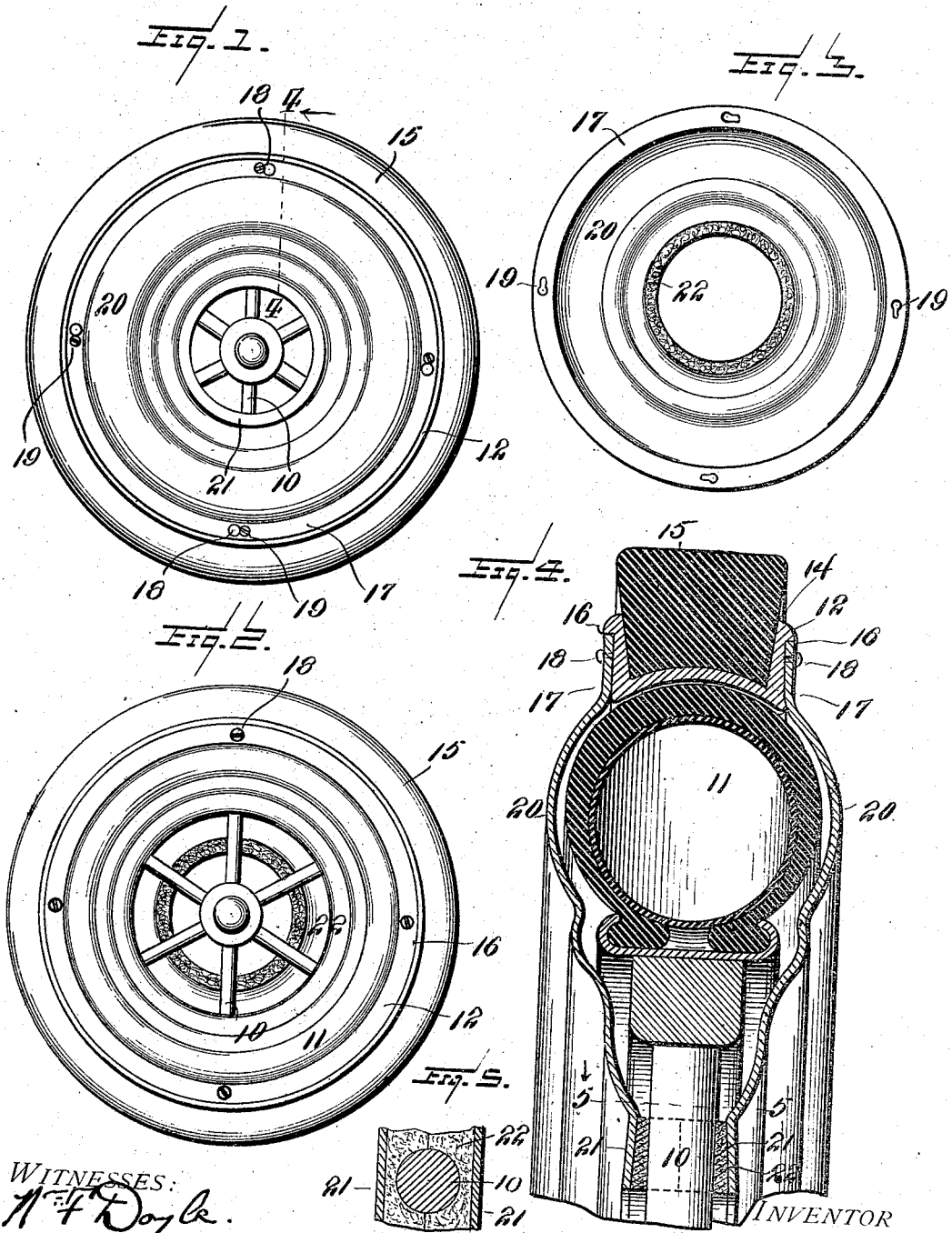

FRANK OSCOR SLANKER, OF POMONA, CALIFORNIA.

TIRE-PROTECTOR HOLDER.

No. 894,751.   Specification of Letters Patent.   Patented July 28, 1908.

Application filed December 20, 1907. Serial No. 407,317.

To all whom it may concern:

Be it known that I, FRANK O. SLANKER, citizen of the United States, residing at Pomona, county of Los Angeles, and State of California, have invented certain new and useful Improvements in Tire-Protector Holders, of which the following is a specification, reference being had therein to the accompanying drawing.

This invention relates to a tire protector holder, and particularly to a holder or casing for surrounding and protecting a pneumatic tire.

The invention has for an object to provide a novel and improved construction of protector embodying an annular rim held in position by the inflated tire and to which opposite inclosing plates are removably attached and extend inward toward the wheel hub, the inner faces of said plates being provided with a packing adapted to surround the wheel spokes and prevent the entrance of dust or foreign substances into the holder.

Other and further objects of the invention will be fully set forth and the novel features thereof defined by the appended claims.

In the drawing:—Figure 1 is an elevation of the protector applied to a wheel; Fig. 2 is a similar view of one of the plates removed; Fig. 3 is an elevation of the inner face of one of the plates; Fig. 4 is an enlarged detail section on the line 4—4, Fig. 1, and Fig. 5 is a detail section on the line 5—5, Fig. 4.

Like numerals refer to like parts in the several figures of the drawing.

The numeral 10 designates a wheel which may be of any desired size or configuration and provided with any preferred form of pneumatic tire 11 secured to the periphery thereof in the usual manner. Surrounding this tire is an annular protecting rim 12 having a curved under face to fit the periphery of the tire when inflated by which the rim is held in position. This rim is provided upon its upper face with a socket 14 adapted to receive any desired form of cushion tire or tread, for instance, the solid rubber tire 15. The outer faces of the rim are provided with shoulders 16 against which the outer portion of the circular plates 17 disposed at the opposite sides of the tire abut. These plates completely surround the tire on both sides and extend inward toward the hub of the wheel but terminate at a distance therefrom so as to allow play or movement for the protector and plates without interference. The plates are retained in position by means of the headed pins 18 extending through the rim 12 at each side and adapted to pass through the bayonet slots 19 formed in the plates 17. These plates are convexed or outwardly curved at 20 opposite the sides of the pneumatic tire so as to allow space for the lateral movement thereof under compression, and the inner portions of the plates are provided with a packing face 21 to which any preferred form of packing to prevent the entrance of dirt or dust may be applied, there being here shown a fibrous packing 22 attached to the portion 21 and of sufficient thickness to completely surround the spokes of the wheel 10 when the plates are secured in position so as to prevent the entrance of dust within the casing formed by these plates. This packing has only light frictional contact with the spokes and readily yields to permit movement of the plates without binding.

In the application of the invention the rim is retained in position by the inflated pneumatic tire and the plates readily applied so as to completely inclose and protect the tire against puncture or other injury, while permitting the necessary movement of the inclosing holder incident to pressure upon the tire either by weight or striking an obstacle which causes a lateral expansion of the inflated tire as well as an inward movement of the protector toward the hub. The cushion tread also assists in producing the desired resiliency and prevents direct contact of the rim with the ground. The protector is readily removable from the tire as it comprises only the rim and attached plates thus presenting a protector capable of application to any ordinary form of wheel or tire without the necessity of change in the construction thereof or any direct attachment thereto. The packing at the inner edge of the plates may be of any desired material in order to properly extend between the spokes and thus form a dust guard at that point. It will therefore be seen that the invention presents a simple, efficient and economically constructed tire protector especially adapted for use in connection with automobiles.

Having described my invention and set forth its merits, what I claim and desire to secure by Letters Patent is:—

1. A tire protector comprising an annular rim provided with headed projections from its sides, opposite annular guard plates slotted to removably embrace said projections and extended inward to form a guard inclosing a portion of the spokes of a wheel intermediate of said rim and the hub thereof, and a yielding packing disposed at the opposite inner faces of the central opening in said plates to surround said spokes.

2. A tire protector comprising an annular rim having a curved inner face, shoulders at the opposite sides thereof, projections extending from said sides, removable plates slotted to engage said projections and shoulders and extended to inclose a portion of the spokes of a wheel.

3. A tire protector comprising an annular rim having a curved inner face, shoulders at the opposite sides thereof, projections extending from said sides, removable plates slotted to engage said projections and shoulders said plates being outwardly bent beneath the rim and thence bent inward toward each other to inclose a portion of the spokes of a wheel, and a dust packing carried by the inner faces of said plates to surround said spokes.

In testimony whereof I affix my signature in presence of two witnesses.

FRANK OSCOR SLANKER.

Witnesses:
 E. BARNES,
 J. E. MCCOMAS.